(12) United States Patent
Grill et al.

(10) Patent No.: US 9,643,809 B2
(45) Date of Patent: May 9, 2017

(54) GUIDE WHEEL ARRANGEMENT

(71) Applicant: BHS Corrugated Maschinen-und Anlagenbau GmbH, Weiherhammer (DE)

(72) Inventors: Martin Grill, Mantel (DE); Michael Hirmer, Weiden (DE)

(73) Assignee: BHS Corrugated Maschinen-und Anlagenbau GmbH, Weiherhammer (DE)

( * ) Notice: Subject to any disclaimer, the term of this patent is extended or adjusted under 35 U.S.C. 154(b) by 253 days.

(21) Appl. No.: 14/276,241

(22) Filed: May 13, 2014

(65) Prior Publication Data

US 2014/0338511 A1    Nov. 20, 2014

(30) Foreign Application Priority Data

May 14, 2013    (DE) .................... 20 2013 102 101 U

(51) Int. Cl.
*B65H 27/00*    (2006.01)
*F16C 13/02*    (2006.01)
(Continued)

(52) U.S. Cl.
CPC ............... *B65H 27/00* (2013.01); *B26D 7/00* (2013.01); *F16C 13/022* (2013.01);
(Continued)

(58) Field of Classification Search
CPC ........ F16D 1/0894; F16D 1/064; F16D 1/072; F16D 1/0852; F16D 1/087;
(Continued)

(56) References Cited

U.S. PATENT DOCUMENTS 696,416 A * 4/1902 Denegre ................ B65H 27/00
                                                100/155 R
733,630 A * 7/1903 Dana ..................... D06C 15/08
                                                122/155.2
(Continued)

FOREIGN PATENT DOCUMENTS

CN         201670615 U    12/2010
CN         101965305 A    2/2011
(Continued)

OTHER PUBLICATIONS

Extended European Search Report of Aug. 25, 2014.
South Korean Office Action of Mar. 2, 2016.

*Primary Examiner* — Jason L Vaughan
(74) *Attorney, Agent, or Firm* — McGlew and Tuttle, P.C.

(57) ABSTRACT

The invention relates to a guide wheel arrangement for guiding two-dimensional material webs, in particular for guiding material webs or material sheets. The guide wheel arrangement comprises a guide wheel comprising an inner central hub section and an outer guide ring, which is connected to the inner hub section in a rotationally fixed manner for guiding the two-dimensional material elements, as well as an insert bushing which is to be arranged on a shaft and is concentrically inserted into the inner hub section, wherein the insert bushing is connected to the guide wheel in a rotationally fixed manner.

22 Claims, 4 Drawing Sheets

(51) Int. Cl.
*B26D 7/00* (2006.01)
*F16D 1/08* (2006.01)
*F16D 7/02* (2006.01)

(52) U.S. Cl.
CPC ........... *F16D 1/0858* (2013.01); *F16D 7/021* (2013.01); *B65H 2401/113* (2013.01); *B65H 2402/62* (2013.01); *B65H 2403/731* (2013.01); *B65H 2403/732* (2013.01); *B65H 2404/117* (2013.01); *B65H 2404/40* (2013.01); *B65H 2601/324* (2013.01); *F16D 1/0876* (2013.01); *Y10T 83/741* (2015.04)

(58) Field of Classification Search
CPC ..... F16D 2300/0032; F16D 2300/0035; B29D 99/0032; B29D 99/0035
USPC ........................ 29/895.32; 403/267, 269, 332
See application file for complete search history.

(56) References Cited

U.S. PATENT DOCUMENTS

| | | | | |
|---|---|---|---|---|
| 1,749,393 | A | | 3/1930 | Pflimlin |
| 2,356,842 | A | * | 8/1944 | Helmond ................ B41J 13/20 100/155 R |
| 2,639,560 | A | * | 5/1953 | Cosmos .................. B24B 21/14 451/303 |
| 2,665,521 | A | * | 1/1954 | Ford .................... A63H 17/262 152/185 |
| 2,715,024 | A | * | 8/1955 | Nydegger ............. B65H 20/02 101/376 |
| 3,212,353 | A | * | 10/1965 | Chapin .................. B29C 33/00 264/274 |
| 3,486,543 | A | * | 12/1969 | Nishimura .............. B27B 25/02 144/250.1 |
| 3,514,829 | A | | 6/1970 | Blatt |
| 3,578,812 | A | * | 5/1971 | Taussig .................... B60B 5/02 152/379.3 |
| 3,659,797 | A | * | 5/1972 | Coy ...................... B65H 20/02 226/186 |
| 3,952,786 | A | * | 4/1976 | Kreling .................... B60B 5/02 152/310 |
| 4,102,731 | A | * | 7/1978 | Hamisch, Jr. ............. B65C 9/18 156/540 |
| 4,230,036 | A | * | 10/1980 | Groome ............. B29D 99/0035 100/176 |
| 4,425,694 | A | * | 1/1984 | Somerville ............ B65H 27/00 271/272 |
| 4,567,633 | A | * | 2/1986 | Corkery .............. B29C 45/1459 264/267 |
| 4,573,563 | A | * | 3/1986 | Delhaes .................. F16C 13/00 193/37 |
| 4,682,393 | A | * | 7/1987 | Corkery .............. B29C 45/1459 301/64.702 |
| 4,823,689 | A | * | 4/1989 | Kishino .................. F16C 13/00 100/155 R |
| 5,142,758 | A | | 9/1992 | Delhaes |
| 5,493,777 | A | * | 2/1996 | Burke ................. B29C 45/1459 29/895.3 |
| 5,833,106 | A | * | 11/1998 | Harris .................. B65H 23/038 226/17 |
| 6,769,679 | B2 | * | 8/2004 | Ishibashi ................ B65H 27/00 271/109 |
| 6,979,129 | B2 | | 12/2005 | Farbaniec et al. |
| 8,132,727 | B2 | | 3/2012 | Hirabayashi et al. |

FOREIGN PATENT DOCUMENTS

| | | |
|---|---|---|
| CN | 102390738 A | 3/2012 |
| DE | 100 18 418 A1 | 10/2001 |
| DE | 600 04 642 T2 | 6/2004 |
| EP | 1 921 027 A1 | 5/2008 |
| EP | 2 251 287 A1 | 11/2010 |
| GB | 464 002 A | 4/1937 |
| GB | 1 205 097 A | 9/1970 |
| JP | 04-223962 A | 8/1992 |
| JP | 2008-163 967 A | 7/2008 |
| JP | 2011 162283 A | 8/2011 |
| JP | 2013-039990 A | 2/2013 |
| KR | 20-0256462 Y | 12/2001 |
| WO | 2012134474 A1 | 10/2012 |

* cited by examiner

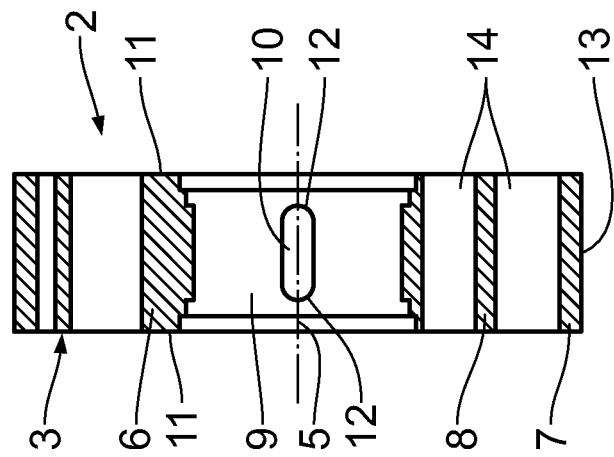
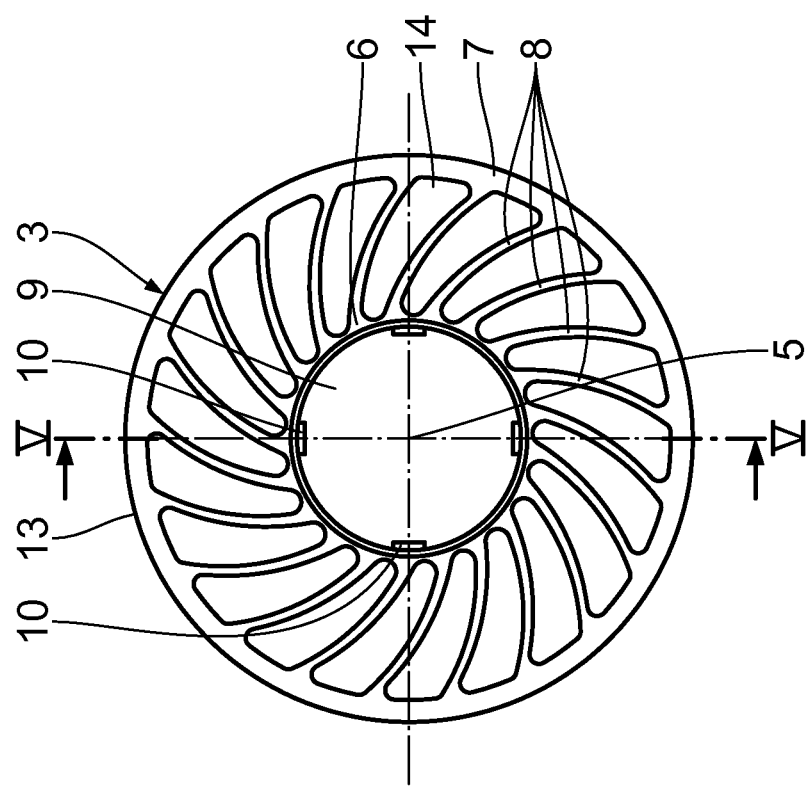

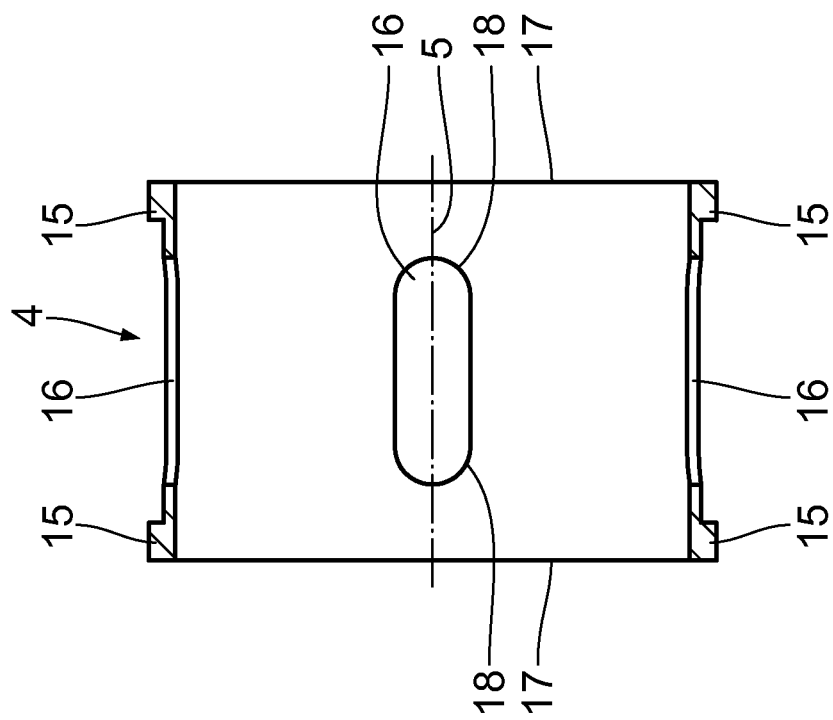
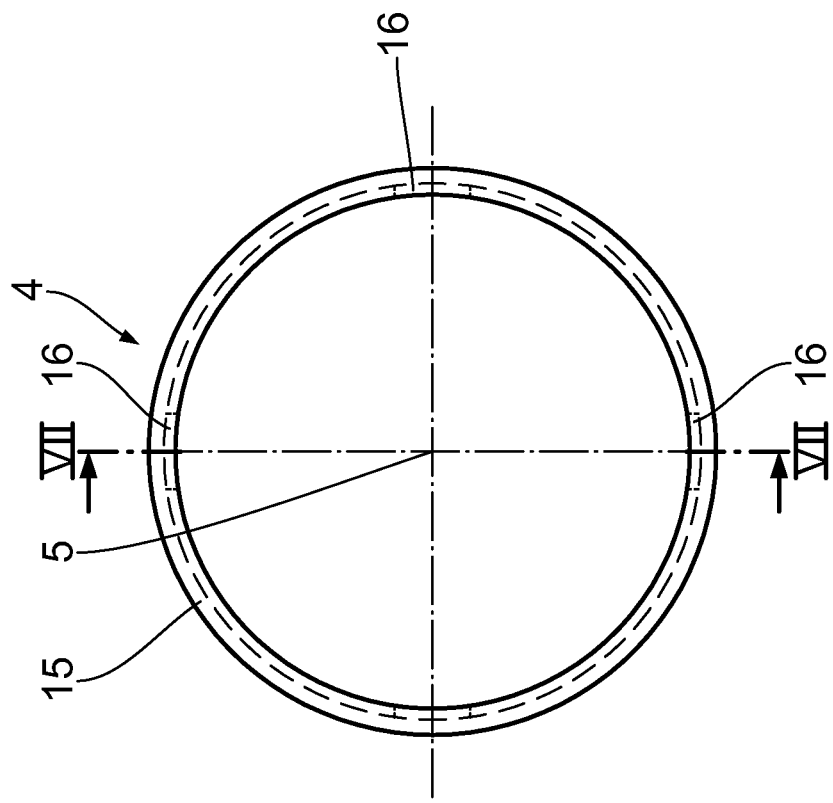

GUIDE WHEEL ARRANGEMENT

CROSS-REFERENCES TO RELATED APPLICATIONS

This invention claims the priority of Patent Application Serial No. DE 20 2013 102 101.6 filed on 14 May 2013, pursuant to 35 U.S.C. 119(a)-(d), the content of which is incorporated herein by reference in its entirety as if fully set forth herein.

FIELD OF THE INVENTION

The invention relates to a guide wheel arrangement for guiding two-dimensional, preferably flexible, material elements, in particular for guiding material webs or material sheets. The material webs are for instance corrugated cardboard webs while the material sheets are preferably corrugated cardboard sheets. The invention further concerns a guide wheel-shaft arrangement comprising at least one guide wheel arrangement of this type. The invention further concerns a cross-cutting device for the cross-cutting of material webs which comprises at least one guide wheel-shaft arrangement of this type.

BACKGROUND OF THE INVENTION

Guide wheel arrangements are commonly used during the production of material webs or material sheets. When performing maintenance and repair works or when assembling new installations, it is often necessary for the guide wheel arrangements to be mounted on shafts or to be removed therefrom. A mounting procedure of this type is extremely laborious, generally requiring at least two persons. Removal is often not easy either.

SUMMARY OF THE INVENTION

An object of the invention is therefore to provide a guide wheel arrangement which is particularly easily replaceable, in other words mountable and demountable, while ensuring the reliable transmission of a torque from the shaft to the guide wheel or to the material elements to be guided. Another object of the invention is provide a guide wheel shaft arrangement which has at least one guide wheel arrangement that is particularly easily replaceable. A corresponding cross-cutting device shall be provided as well.

This object is achieved according to the invention by a guide wheel arrangement for guiding two-dimensional material webs, in particular for guiding material webs or material sheets, the guide wheel arrangement comprising a guide wheel comprising an inner central hub section and an outer guide ring which is connected to the inner hub section in a rotationally fixed manner for guiding the two-dimensional material elements, and an insert bushing which is to be arranged on a shaft and is concentrically inserted into the inner hub section, wherein the insert bushing is connected to the guide wheel in a rotationally fixed manner, by a guide wheel-shaft arrangement comprising a shaft and at least one guide wheel arrangement according to the invention which is arranged on the shaft, wherein the insert bushing is positioned adjacent to the shaft, and wherein the insert bushing is arranged between the shaft and the guide wheel, and by a cross-cutting device for the cross-cutting of material webs, the cross-cutting device comprising at least one cross-cutting unit and at least one guide wheel-shaft arrangement according to the invention which is arranged upstream and/or downstream of the cross-cutting unit.

The gist of the invention is that an insert bushing is centrally inserted into the inner hub section. The insert bushing facilitates the arrangement of the guide wheel on the shaft. Another advantage is that the removal thereof from the shaft is considerably facilitated as well.

The guide wheel arrangement for instance ensures that the material webs or material sheets are pressed down or supported. It is preferably used for advancing the material webs or material sheets in the transport direction thereof.

The rotationally fixed connection between the inner hub section and the outer guide ring allows a torque to be transmitted from the hub section to the guide ring. A limited or slight relative rotational movement is for instance possible between the inner hub section and the outer guide ring. Alternatively, a relative rotational movement of this type between the inner hub section and the outer guide ring is completely eliminated.

The guide wheel arrangement has a central longitudinal axis about which the guide wheel arrangement is rotatable or drivable for rotation. The hub section has a central receiving opening in which the insert bushing is disposed. The central longitudinal axis of the guide wheel coincides with that of the insert bushing to form the central longitudinal axis of the guide wheel arrangement.

The guide ring has a guide surface or running surface on its outside for guiding the two-dimensional material elements. The guide surface is in direct or indirect contact with the material elements to be guided. It is advantageous if the guide surface is smooth or profiled.

The guide wheel is preferably configured such as to form one piece.

It is advantageous if the rotationally fixed connection between the guide wheel and the insert bushing is obtained by means of a positive fit, a non-positive fit and/or a substance-to-substance bond.

The insert bushing has a circular cross-section. The outer diameter thereof is adapted to the hub section. The inner diameter thereof is adapted to the shaft.

In a guide wheel-shaft arrangement according to the invention, at least one guide wheel arrangement is arranged on the shaft. It is advantageous if several guide wheel arrangements are arranged on the shaft next to one another. In a particularly preferred embodiment, the guide wheel arrangements have an identical distance from each other along the shaft and provide a common guide surface or running surface.

It is advantageous if the at least one cross-cutting unit according to the invention comprises at least one cutting knife or the like.

The embodiment in which the guide wheel is made of a guide wheel material and the insert bushing is made of an insert bushing material, wherein the guide wheel material and the insert bushing material are different from each other, wherein the guide wheel material preferably is/comprises polyurethane, and wherein the insert bushing material is/comprises plastics, preferably polyamide, more preferably polycaprolactam (=PA6), allows each of the guide wheel material and the insert bushing material to be selected in a defined manner so as to achieve the desired or required properties.

As already mentioned above, the guide wheel material is or comprises polyurethane. This material is extremely temperature-resistant in use. Another property of polyurethane is that it is particularly capable of absorbing mechanical loads such as compressive forces or weight forces. It is advantageous if the polyurethane is highly cross-linked.

As already mentioned above, the insert bushing material is plastics, preferably polyamide, more preferably polycaprolactam (PA6). This material has good sliding properties, thus allowing the guide wheel arrangement to be easily mounted on or removed from the shaft. It is advantageous if the shaft is made of a metal material.

The embodiment in which the outer guide ring is resiliently connected to the inner hub section ensures that the guide wheel is particularly capable of absorbing mechanical loads. The resilience thereof ensures a particularly gentle transport. Wear of the guide wheel arrangement is effectively pre-vented.

It is advantageous if the spring webs for interconnecting the outer guide ring and the inner hub section in a rotationally fixed manner are configured in the shape of lamellas. The spring webs define lateral openings the in the guide wheel, which improves the resilience of the guide wheel.

The inclined arrangement of the spring webs when seen in the peripheral direction of the guide ring and/or the hub section allows the resilience and load bearing capacity of the guide wheel to be adjusted in a particularly easy manner.

According to one embodiment of the invention, the guide wheel is formed in a casting process, in other words an original forming process, taking place in a mold. This allows the guide wheel to be produced in a particular cost-effective manner. Various casting methods are applicable.

According to one embodiment of the invention, the guide wheel is cast around the insert bushing. The guide wheel material is thus cast in such a way as to form one piece with the insert bushing. To this end, the prefabricated insert bushing is placed in a corresponding mold of a casting installation, with the guide wheel material then being cast into the mold such as to form the guide wheel. The insert bushing is thus cast into the guide wheel. It is advantageous if a rigid connection is produced between the insert bushing and the guide wheel, the connection being permanent or detach-able.

According to one embodiment of the invention, the periphery of the insert bushing is provided with at least one continuous hub section window. This hub section window is for instance produced by milling. The hub section engages with the hub section window from outside, preferably such as to form a positive fit, thus allowing a particularly effective torque transmission to be achieved between the insert bushing and the guide wheel.

According to one embodiment of the invention, the hub section or the guide wheel, respectively, passes through the at least one hub section window in the insert bushing from outside in such a way as to form a positive fit and protrudes radially inwardly with respect to the at least one hub section window or the insert bushing, respectively, so as to abut against the shaft.

It is advantageous if the at least one hub section window has an elongated shape in the direction of the central longitudinal axis of the insert bushing.

The embodiments of the guide wheel arrangement in which the at least one hub section window is completely closed in its peripheral direction, and in which more than one of the hub section windows are provided, wherein the hub section windows have an identical distance from each other in the peripheral direction of the insert bushing, ensure a particularly effective torque transmission.

According to one embodiment of the invention, the portion of the guide wheel passing through the at least one hub section window abuts against the periphery of the shaft for transmission of a torque from the shaft to the guide wheel or the guide wheel arrangement, respectively, wherein the portion of the guide wheel passing through the at least one hub section window preferably allows a substantially pre-defined maximum torque to be transmitted. As soon as the predefined torque is reached, a slip occurs between the shaft and the guide wheel or the guide wheel arrangement, respectively.

It is advantageous if, for transmission of a torque from the shaft to the guide wheel or the guide wheel arrangement, respectively, the guide wheel or guide wheel arrangement, respectively, abuts against the periphery of the shaft only in the region of the portion of the guide wheel passing through the at least one hub section window or the insert bushing, respectively. Favourably, the portion of the guide wheel passing through the at least one hub section window thus defines an intermediate or free space between the shaft and the insert bushing. The guide wheel arrangement or the guide wheel, respectively, is therefore arranged at a distance from the shaft except in the region of the portion of the guide wheel passing through the at least one hub section window. The portion of the guide wheel passing through the at least one hub section window is for instance a single, continuous portion or it is formed by individual segments arranged at a distance from each other.

The following description refers to a preferred embodiment of the invention which is described as an example with reference to the attached drawing.

BRIEF DESCRIPTION OF THE DRAWING

FIG. 4 shows a front view of a guide wheel of the guide wheel-shaft arrangement shown in FIGS. 1 to 3;

FIG. 5 shows a longitudinal section along section line V-V in FIG. 4 through the guide wheel shown in FIG. 4;

FIG. 6 shows a front view of an insert bushing of the guide wheel-shaft arrangement shown in FIGS. 1 to 3; and FIG. 7 shows a longitudinal section along section line VII-VII in FIG. 6 through the insert bushing shown in FIG. 6.

DESCRIPTION OF THE PREFERRED EMBODIMENT

Figure 2:
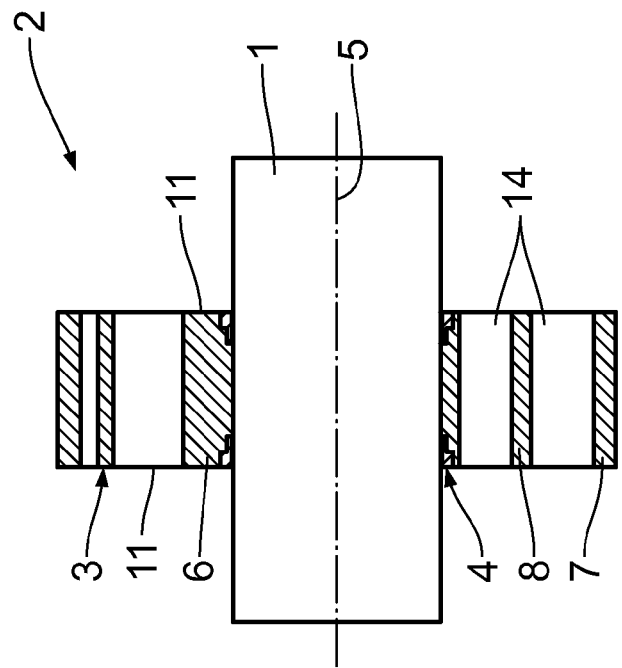
FIG. 2 shows a longitudinal section along section line II-II in FIG. 1 through the guide wheel-shaft arrangement shown in FIG. 1.
Figure 1:
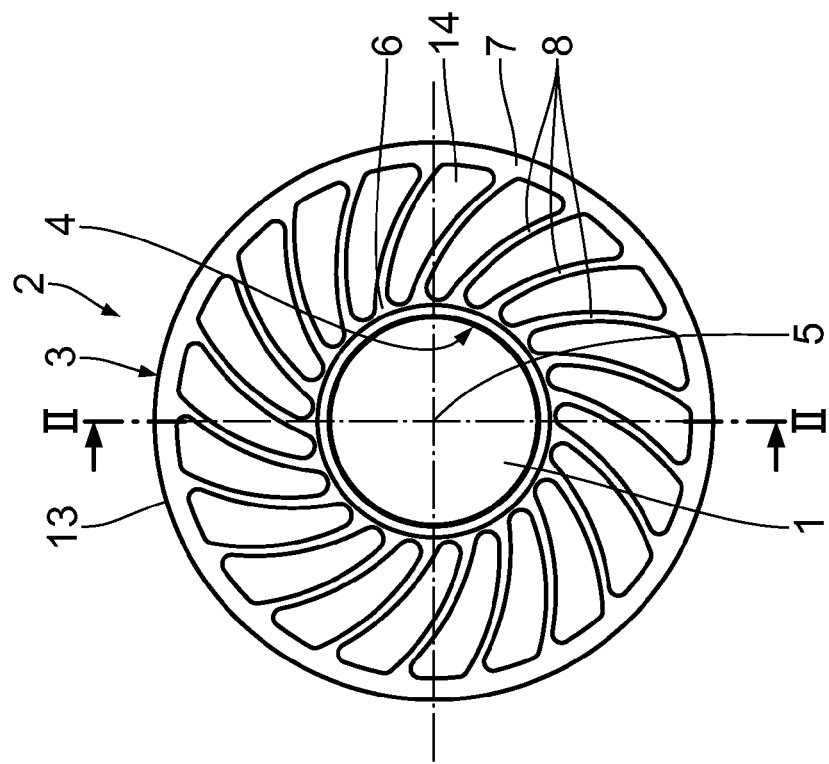
FIG. 1 shows a front view of a guide wheel-shaft arrangement according to the invention.
Figure 3:
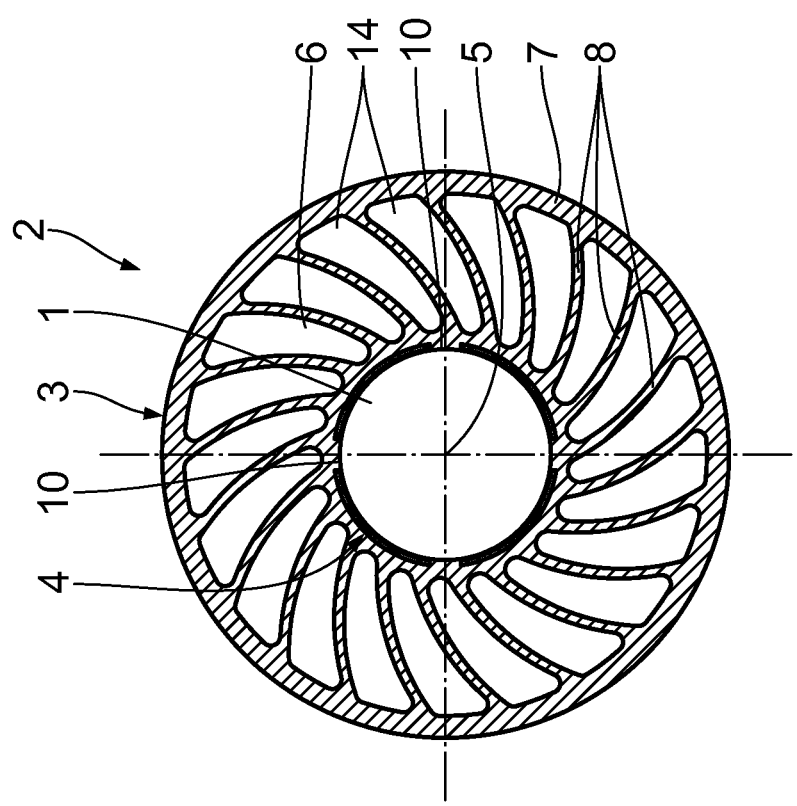
FIG. 3 shows a cross-section through the guide wheel-shaft arrangement shown in FIGS. 1 and 2.

A guide wheel-shaft arrangement shown in its entirety in FIGS. 1 to 3 comprises a shaft 1 and a guide wheel arrangement 2 which is disposed on the shaft 1 and forms a torque-transmitting connection with said shaft 1. The guide wheel arrangement 2 has a guide wheel 3 and an insert bushing 4 inserted centrally into the guide wheel 3. The guide wheel-shaft arrangement has a central longitudinal axis 5 about which it is rotatable or drivable for rotation.

The guide wheel 3 is in turn provided with a radially inner central hub section 6 and a radially outer guide wheel 7 which forms a rotationally fixed and resilient connection with the hub section 6 via spring webs 8.

The hub section 6 defines a cylindrical receiving opening 9 in a radially outward direction. The hub section 6 has engagement projections 10 which protrude radially inwardly into the receiving opening 9, have an identical angular distance from each other relative to the central longitudinal axis 5 or in the peripheral direction of the hub section 6, respectively, and are configured identically. The engagement projections 10 are configured in the manner of a spring. They are arranged at a distance from the front ends 11 of the guide wheel 3 which are arranged opposite to each other. The engagement projections 10 extend in the direction of the central longitudinal axis 5 and have rounded longitudinal ends 12 arranged opposite to each other. In this embodiment, four engagement projections 10 are provided. Another number is conceivable as well.

The guide wheel 7, which has the shape of a circular cylinder, has a radially outer guide surface 13 which may also be referred to as running surface.

As already mentioned, the guide wheel 7 is connected to the radially inner hub section 6 in a rotationally fixed manner via spring webs 8. The spring webs 8 are inclined in the peripheral direction of the guide wheel 3, thus extending at an angle relative to the radial as well. The spring webs 8 define spring chambers 14 in the peripheral direction of the guide wheel 3. They may be straight or curved. The spring chambers 14 become wider when seen from the hub section 6 in the direction of the guide wheel 7. The spring chambers 14 are bounded in the radially inward direction by the hub section 6 and by the guide wheel 7 in the radially outward direction. Another arrangement of the spring webs 8 or of the spring chambers 14 is alternatively conceivable as well.

The front ends of the insert bushing 4 are in each case provided with an annular web 15 protruding in the radially outward direction. The annular webs 15 engage with corresponding annular recesses in the guide wheel 3 such that a positive fit is formed, which ensures that the insert bushing 4 and the hub section 6 are axially secured in the direction of the central longitudinal axis 5.

The insert bushing 4 is provided with elongated hub section windows 16 which completely penetrate or pass through the insert bushing 4 in the radial direction. The number, shape and arrangement of the hub section windows 16 is in each case adapted to the number, shape and arrangement of the engagement projections 10. In other words, the insert bushing 4 is provided with four hub section windows 16. The hub section windows 16 are arranged at a distance from the front ends 17 of the insert bushing 4, each extending in the direction of the central longitudinal axis 5. They have rounded longitudinal ends 18. The radial thickness of the insert bushing 4 in the region of the hub section windows 16 is lower than the radial height of the engagement projections 10. The insert bushing 4 has a substantially constant radial thickness between the annular webs 16.

The engagement projections 10 completely pass through and engage into the hub section windows 16 from radially outside in such a way that a positive fit is formed. The engagement projections 10 protrude radially inwardly relative to the hub sections windows 16 or the insert bushing 4, respectively. Preferably, the engagement projections 10 protrude radially inwardly relative to the hub section windows 16 or the insert bushing 4, respectively, by an amount in the range of between 0.1 mm and 2 mm, more preferably between 0.2 mm and 1 mm, allowing a corresponding intermediate or free space having a radial height of this magnitude to be produced between the shaft 1 and the insert bushing 4 as well. The positive engagement between the engagement projections 10 and the hub section windows 16 ensures that the guide wheel 3 and the insert bushing 4 are on the one hand axially secured in the direction of the central longitudinal axis 5 and that the guide wheel 3 and the insert bushing 4 are secured in the peripheral direction of the guide wheel arrangement on the other, which allows a torque to be transmitted between the insert bushing 4 and the guide wheel 3. The connection between the guide wheel 3 and the insert bushing 4 is quasi a tongue-and-groove connection.

When the guide wheel arrangement 2 is mounted to the shaft 1, the engagement projections 10 abut against the outer periphery of the shaft 1, thus providing for a torque transmission between the shaft 1 and the guide wheel arrangement 2. The engagement projections 10 protruding radially inwardly relative to the hub section windows 16 or the insert bushing 4, respectively, provide for a substantially annular intermediate or free space having a radial height of between 0.1 and 2 mm, more preferably between 0.2 mm and 1 mm. As soon as a threshold torque value is reached, a relative rotational movement is possible between the shaft 1 and the guide wheel arrangement 2. The engagement projections 10 allow transmission of a substantially predefined maximum torque.

The guide wheel arrangement is mountable near the inlet and/or outlet of a cross-cutting device (not shown). The cross-cutting device performs the cross-cutting process. The guide wheel-shaft arrangement may for instance be mounted downstream of the cross-cutting unit to produce the required distance between the individual material webs.

What is claimed is:

1. A guide wheel arrangement for guiding two-dimensional material elements, the guide wheel arrangement comprising:
   a guide wheel comprising an inner central hub section and an outer guide ring which is connected to the inner hub section in a rotationally fixed manner for guiding the two-dimensional material elements; and
   an insert bushing which is to be arranged on a shaft and is concentrically inserted into the inner hub section, wherein the insert bushing is connected to the guide wheel in a rotationally fixed manner, wherein at least one hub section window is formed in a periphery of the insert bushing, the hub section engaging from outside into the at least one hub section window.

2. A guide wheel arrangement according to claim 1, wherein the guide wheel arrangement is used for guiding one of the group comprising material webs and material sheets.

3. A guide wheel arrangement according to claim 1, wherein the guide wheel is made of a guide wheel material and the insert bushing is made of an insert bushing material, wherein the guide wheel material and the insert bushing material are different from each other.

4. A guide wheel arrangement according to claim 3, wherein the guide wheel material is or comprises polyurethane.

5. A guide wheel arrangement according to claim 3, wherein the insert bushing material is or comprises plastics.

6. A guide wheel arrangement according to claim 5, wherein the insert bushing material is or comprises polyamide.

7. A guide wheel arrangement according to claim 5, wherein the insert bushing material is or comprises polycaprolactam.

8. A guide wheel arrangement according to claim 1, wherein the outer guide ring is resiliently connected to the inner hub section.

9. A guide wheel arrangement according to claim 8, wherein the outer guide ring and the inner hub section are interconnected in a rotationally fixed manner by resilient spring webs.

10. A guide wheel arrangement according to claim 9, wherein the spring webs are inclined in a peripheral direction of at least one of the guide ring and the hub section.

11. A guide wheel arrangement according to claim 1, wherein the guide wheel is a cast part.

12. A guide wheel arrangement according to claim 11, wherein the guide wheel is cast around the insert bushing.

13. A guide wheel arrangement according to claim 1, wherein the hub section engages into the at least one hub section window such that a positive fit connection is formed between the guide wheel and the insert bushing.

14. A guide wheel arrangement according to claim 1, wherein the hub section passes through the at least one hub section window from outside such as to form a positive fit connection between the guide wheel and the insert bushing and protrudes relative to the hub section window in a radially inward direction so as to abut against the shaft.

15. A guide wheel arrangement according to claim 14, wherein the hub section protrudes relative to the at least hub section window in a radially inward direction by an amount in a range of between 0.1 mm and 2 mm.

16. A guide wheel arrangement according to claim 1, wherein the at least one hub section window is completely closed in a peripheral direction of the at least one hub section window.

17. A guide wheel arrangement according to claim 1, wherein more than one hub section is provided to provide a number of hub section windows, wherein the hub section windows have an identical distance from each other in a peripheral direction of the insert bushing.

18. A guide wheel arrangement according to claim 1, wherein each front end of the insert bushing is provided with an annular web protruding in a radially outward direction, wherein the annular webs engage into corresponding annular recesses in the guide wheel in such a way as to form a positive fit connection between the guide wheel and the insert bushing.

19. A guide wheel-shaft arrangement comprising:
a shaft; and
at least one guide wheel arrangement which is arranged on the shaft, said at least one guide wheel arrangement comprising a guide wheel, said guide wheel comprising an inner central hub section and an outer guide ring which is connected to the inner hub section in a rotationally fixed manner for guiding two-dimensional material elements, said guide wheel arrangement further comprising an insert bushing which is to be arranged on a shaft and is concentrically inserted into the inner hub section, the insert bushing being connected to the guide wheel in a rotationally fixed manner, wherein at least one hub section window is formed in a periphery of the insert bushing, the hub section engaging from outside into the at least one hub section window, the insert bushing being positioned adjacent to the shaft, the insert bushing being arranged between the shaft and the guide wheel.

20. A guide wheel-shaft arrangement according to claim 19, wherein a portion of the guide wheel passing through the at least one hub section window abuts against the periphery of the shaft for transmission of a torque from the shaft to the guide wheel.

21. A guide wheel-shaft arrangement according to claim 20, wherein the portion of the guide wheel passing through the at least one hub window allows transmission of the torque which is substantially predefined.

22. A cross-cutting device for the cross-cutting of material webs, comprising:
at least one cross-cutting unit; and
at least one guide wheel-shaft arrangement which is arranged relative to the cross-cutting unit in at least one of the positions comprising an upstream and a downstream position, said at least one guide wheel arrangement comprising a guide wheel, said guide wheel comprising an inner central hub section and an outer guide ring which is connected to the inner hub section in a rotationally fixed manner for guiding the two-dimensional material elements, said guide wheel arrangement further comprising an insert bushing which is to be arranged on a shaft and is concentrically inserted into the inner hub section, the insert bushing being connected to the guide wheel in a rotationally fixed manner, wherein at least one hub section window is formed in a periphery of the insert bushing, the hub section engaging from outside into the at least one hub section window.

* * * * *